Figure 4:
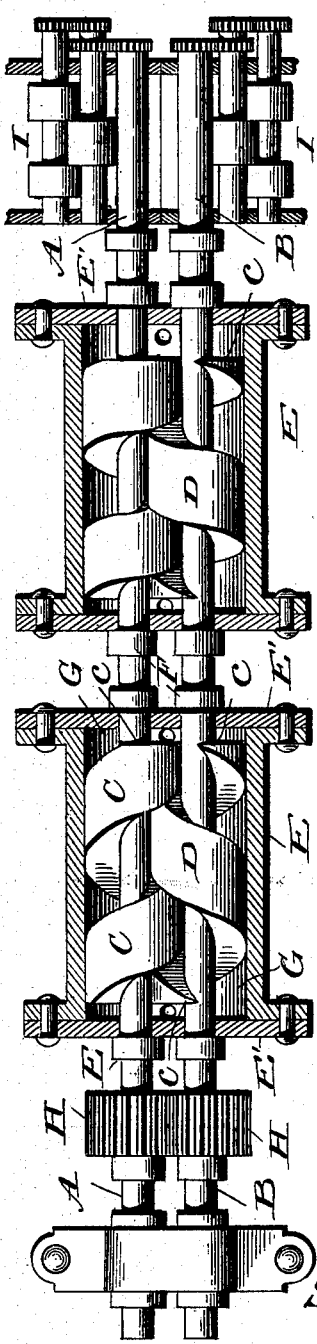

No. 750,532. PATENTED JAN. 26, 1904.
S. GEORGE.
STEAM AND HYDRAULIC SPIRAL MOTOR.
APPLICATION FILED MAR. 5, 1896. RENEWED OCT. 30, 1903.
NO MODEL. 2 SHEETS—SHEET 1.
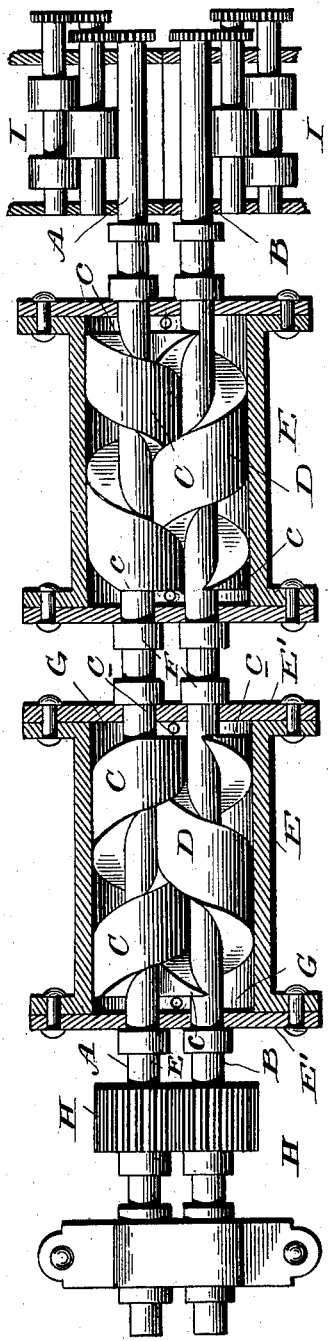
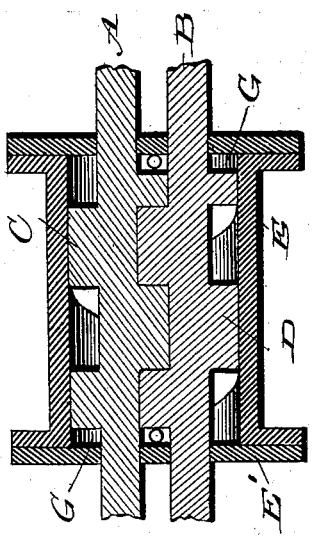
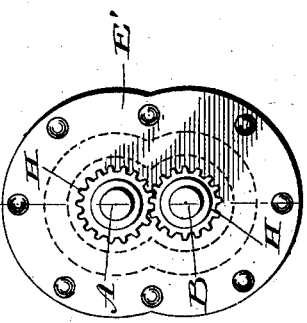
Witnesses
L. C. Hills.
J Henry Hills
Inventor
Seymour George
By E. H. Bond
Atty.

No. 750,532. PATENTED JAN. 26, 1904.
S. GEORGE.
STEAM AND HYDRAULIC SPIRAL MOTOR.
APPLICATION FILED MAR. 5, 1896. RENEWED OCT. 30, 1903.
NO MODEL. 2 SHEETS—SHEET 2.

Witnesses
L. C. Hills.
Henry Hills.

Inventor:
Seymour George,
By E. H. Bond
Attorney

No. 750,532. Patented January 26, 1904.

UNITED STATES PATENT OFFICE.

SEYMOUR GEORGE, OF ALTOONA, PENNSYLVANIA, ASSIGNOR OF ONE-HALF TO CHARLES FRANCIS HARRIS, OF PITTSBURG, PENNSYLVANIA.

STEAM AND HYDRAULIC SPIRAL MOTOR.

SPECIFICATION forming part of Letters Patent No. 750,532, dated January 26, 1904.

Application filed March 5, 1896. Renewed October 30, 1903. Serial No. 179,237. (No model.)

*To all whom it may concern:*

Be it known that I, SEYMOUR GEORGE, a citizen of the United States, residing at Altoona, in the county of Blair and State of Pennsylvania, have invented a Steam and Hydraulic Spiral Motor, of which the following is a specification.

My invention relates to rotary motors of that class in which is employed two oppositely-disposed screws upon parallel shafts and mounted within a shell or cylinder which closely fits the perimeters of the threads of the said screws.

It has for its objects, among others, to provide an improved motor of this class which shall be simplified in its construction and by which the horizontal friction from the back pressure or centrifugal force of the screws is obviated. I aim, further, to overcome the vibration which has been heretofore found to be one of the great impediments to marine propulsion.

I so form the threads upon the shafts that each screw shall comprise but two complete spirals or threads and the threads at each end terminate in acute angles, whereby they form cut-offs, so that when the shafts are in motion the acute angle of the thread of the one screw closing against the thread of the opposing screw will cut off the steam at one end, while at the same time it opens at the opposite end, and thus allows the steam to escape. I thus cut off and exhaust at the same instant instead of withholding the exhaust till the screw has made a partial revolution, as is the case where the screw-threads extend around their shaft for a greater distance than two complete threads, as has been heretofore proposed. A further object in thus cutting off the ends of the threads at an acute angle is to shorten the motor. I have found that the portion of the ends of the threads beyond where I cut them off is unnecessary for the successful operation of the device, and by cutting them off I save in the length of the motor and further effect a saving in weight, material, and cost of manufacture.

Still another object of the invention is to so proportion the threads and the grooves as to form a tight joint therebetween. By giving the proper pitch to the screws and by making the periphery of the thread of one screw so that it will tightly and neatly fit the base or seat of the groove of the opposite screw and also having the edges or sides of the threads of the one screw fit tightly and neatly to the sides or edges of the threads of the other screw a perfectly tight joint is provided, and yet undue friction is not produced.

The pitch of the screws is to be varied according to the use to which the motor is to be put. If used as a hydraulic engine for pumping or forcing water or other fluids, the pitch of the screws should be equivalent to not more than one thread to the inch on a shaft of one inch in diameter, or at an angle of twenty-two and a half degrees, the object being to provide against undue resistance when pumping water or other fluids by decreasing the leverage of the screws, thus reducing the resistance to be overcome by the power of the combined driving-motor; but when used as an engine to be driven by steam or water the screws should be made on a pitch equivalent to one thread in two inches on a shaft one inch in diameter, or at an angle of forty-five degrees. This angle is important in a motor driven by water or steam for power, as otherwise there would be a loss of leverage with its resultant disadvantages.

Means, such as roller-bearings, are employed to prevent spreading of the shafts and to compensate for wear of the shaft-bearings.

Other objects and advantages of the invention will hereinafter appear, and the novel features thereof will be specifically defined by the appended claims.

The objects above outlined are attained by the mechanism illustrated in the accompanying drawings, which, with the letters of reference marked thereon, form a part of this specification and which illustrate what I at the present time consider as the most preferable means of carrying out my invention, although it will be understood that I do not intend to restrict myself to the details of construction therein exhibited except as hereinafter specifically mentioned in the claims.

Referring to the drawings, Figure 1 is a longitudinal section with parts in elevation. Fig. 2 is an end view. Fig. 3 is a section through one of the cylinders and its screws, the section being taken on the line 3 3 of Fig. 2. Fig. 4 is a longitudinal section showing the embodiment of the invention in a hydraulic motor.

Like letters of reference indicate like parts throughout the several views.

Referring now to the details of the drawings by letter, A designates a shaft, and B a shaft parallel therewith. It is of course to be understood that these shafts are to be suitably mounted and that they may be of any required length and diameter. On each of these shafts is a screw, in this instance shown as formed integral with the shaft, the pitch or angle of the threads varying according to circumstances, as will be more fully hereinafter explained. When designed to be driven by steam, water, or other fluids for power, the pitch or angles of the screws should be not less than one full thread in two inches around a shaft one inch in diameter, or at an angle of substantially forty-five degrees. I have found that any shorter pitch or any less angle of the threads will cause a loss of leverage in the spiral piston formed by the screws, and thus weaken or lessen the power of the motor. When used for driving or pumping water or other fluids, the pitch or angle of the screw-threads should be not more than one thread to the inch on a shaft one inch in diameter, or at an angle of not more than twenty-two and a half degrees, the object being to avoid too great resistance. A greater pitch or angle is not practicable as a pump or hydraulic motor.

The screws C and D are so formed that each screw shall comprise but two complete spirals or threads, and the threads at each end terminate in acute angles, whereby they form cut-offs, so that when the shafts are in motion the acute angle of the thread at the end of one screw closing against the thread of the opposing screw will cut off the steam or other fluid at one end, while at the same instant it opens at the opposite end, and thus allows the steam to escape. Thus the cut-off and exhaust occur simultaneously, and there will be two such exhausts at each revolution of the piston. As seen clearly in Fig. 1, the two screws are oppositely disposed—that is, one is a right-hand and the other a left-hand screw. The threads of the two screws intermesh, as shown, and the perimeter of the threads of the one screw fit neatly and snugly the base and sides of the grooves of the opposing screw, and vice versa, and the edges or sides of the threads of the one screw fit neatly and snugly to the sides or edges of the threads of the other screw, thus becoming steam or air tight. Instead of having the outer faces of the end portions of the threads of the screws parallel with the inner faces thereof I cut away the said outer faces, as indicated at c, which cutting away serves a twofold purpose: It brings the end of the thread to a point—a sharp point—as seen best in Fig. 1, to better form the cut-off and to allow for the escape of the exhaust, and it shortens the motor, as well as reducing the weight and cost of production of the motor.

E is a steam and water tight casing or elliptical cylinder, within which the screws are located. It is shown as provided with removable heads E', provided with stuffing-boxes F for the shafts. The ends of the screws terminate at a distance more or less from the inner walls of the heads of the casing or cylinder, as seen in Fig. 1, to form steam-spaces G at opposite ends of the casing. It is to be understood that these spaces constitute the chambers for the admission of steam, water, or other fluids at one end of the casing and its discharge or exhaust at the opposite end.

The shafts A and B extend beyond the end of the casing, and on the said shafts exterior of the casing are the gears H H, which are mounted to intermesh, as seen clearly in Figs. 1 and 2, to insure perfect uniform rotation.

In Fig. 1 I have shown two of these engines or motors upon the same shaft; but the screws are reversed or inverted—that is, the angles of the threads of the screws of the one motor diverge to the right and those of the other to the left—as will be readily understood from said Fig. 1, the object being that when both motors are in motion the one will counteract the centrifugal force of the other, and thus overcome the horizontal friction upon the bearings of the shafts from such centrifugal force. As will be seen from said Fig. 1, the two motors are arranged each in a separate casing or cylinder instead of in a common cylinder, as has been proposed. This is deemed essential, for the reason that by so doing lighter shafts may be used and the bearings brought closer together, and thus the liability of wear and strain, as well as leakage, is avoided. Furthermore, better results are attained than where the two motors are arranged within one and the same casing or cylinder.

The operation will be readily understood from the foregoing description when taken in connection with the annexed drawings, and a further detailed description thereof is not deemed necessary.

It will be seen that the expansive power of the steam or other agent is pressing against the casing-heads and the threads of the right and left hand screws at the same moment and continuously. Hence there is no point in the revolutions of the screws where the engine can get on a dead-center. The threads of the screws being on a pitch or angle of forty-five degrees the expansive power of the steam upon the threads of the screws continuously is equivalent to the same amount and head of steam in one cylinder of equal steam capacity against a piston and would give the same power, the leverage upon the shafts being equal. No packing is required except on the shafts where they pass through the casing-heads, at which points proper stuffing-boxes are provided. The threads of the screws being fitted tightly at the sides and bottoms of the grooves and the perimeters of the threads being fitted tightly to the inner surface of the casing as tightly as two metals can lay together and move on the surface of each other are therefore steam-tight, and when once made steam-tight there can be no wear except the bearings and boxings of the shafts get out of order, thus permitting the shafts to get out of line, or by the wearing of the collars of the shafts, thereby causing horizontal lost motion, or by the wearing of the gears H, with the resultant disadvantages. None of these contingencies, however, in this case can arise, as I provide double roller-boxings, by means of which all friction will be transferred from the main shafts to a third shaft, the said third shaft revolving at a much less speed than the main shafts. These third shafts are to be provided with self-adjusting devices by means of which all lost motion from the wearing of bearings or boxings will be immediately taken up and the main shafts cannot get out of line with their casings. The main shafts cannot spread to the right or to the left when these boxings are employed, nor can the main shafts sink from their own weight, and thus fall out of line in that direction. The particular construction of these roller-boxings is not claimed herein, as it forms the subject-matter of a separate application. I have indicated, however, in Fig. 1 at the right sufficient of such boxing to make clear its relation to the main shafts. It will be understood that there is to be one of such boxings at each end of the main shafts and that by proper adjustment all possible wear is compensated for. I have designated the boxing, as a whole by the letter I. Detailed description is not deemed necessary; but reference may be had to the above-mentioned application for a fuller understanding of the construction and operation of such boxing.

It is deemed advisable at this point to call attention to the advantages gained by having the pitch of the screws of one motor at an angle of not less than forty-five degrees and the pitch of the screws of the other motor at an angle of not more than twenty-two and a half degrees when two motors are thus combined, which is as follows: Any less pitch of the screw of a motor to be driven by steam or water would cause a loss of leverage in the spiral piston, and thus lessen the power of the steam, thereby causing a waste of steam to no purpose, and in like manner the opposite motor to be driven by the steam or water motor by making the pitch of the screw not more than twenty-two and a half degrees is to avoid increasing the leverage, and thus resistance, against the driving power of the opposite motor. Hence the pitch of the screws of the pumping-motor can be lessened to suit the power of the driving-motor, thereby maintaining the power of the driving-motor greater and superior to the resisting power of the pumping-motor.

Having thus described my invention, what I claim as new, and desire to secure by Letters Patent, is—

1. In a motor of the class described, the combination of two spiral motors in separate casings, with the angles of the threads of the two motors diverging in the same general direction, each screw having similar threads and grooves to equalize the power on the two screws, the angles of the threads of the one motor designed for pumping water being not more than twenty-two and a half degrees, and that of the other designed to be driven by steam or water being substantially forty-five degrees, whereby the resistance of the former is reduced so as to be overcome by the power of the latter and means for the admission and exhaust of steam to and from the ends of said casings, substantially as described.

2. In a spiral motor, the combination of two shafts arranged parallel with each other, each shaft having alternate threads and grooves of the same width and the threads on each shaft being disposed at an angle of substantially forty-five degrees and comprising two complete threads only with the threads of each shaft fitting tightly the grooves of the opposite shaft, and two independent sets of threads on the same shafts with the angles the same but diverging in the opposite direction, whereby the two motors will counteract the centrifugal force of each other and thus overcome end thrust and means for the admission of steam to and its exhaust from the ends of said casings, substantially as described.

3. In a motor of the class described, the combination of two intermeshing right and left hand screws with two complete threads only on each screw with the threads and grooves of each screw the same width and their sides and perimeters tightly fitting the sides and bases of the grooves so that the power is applied equally to the two screws, and the outer faces of each screw cut away at substantially right angles with their shafts so that the terminations of the threads at each end of the same shall form practically sharp angles to prevent the ends of the threads from obstructing the admission of steam or other fluids in their passage to the grooves whereby the exhaust at one end will occur simultaneously with the cut-off at the other end and means for the admission and exhaust of steam to and from the ends of said casings, substantially as described.

4. In a spiral rotary motor, the combination with two spiral motors in separate casings with the angles of the threads of the two motors diverging in the same general direction, each screw having similar threads and grooves to equalize the power on the two screws, the angles of the threads of the one motor designed for pumping water being not more than twenty-two and one-half degrees, and that of the other designed to be driven by steam or water being substantially forty-five degrees, whereby the resistance of the former is reduced so as to be overcome by the power of the latter, and means for admission and exhaust of steam to and from the ends of said casing, and means for taking up the lost motion from wear of the bearings of the outer shaft resulting from side pressure horizontally, or the sinking of the same vertically, thereby avoiding leakage of steam between the perimeters of the threads of the screws and the base of the grooves and casings, all substantially as shown and described.

SEYMOUR GEORGE.

Witnesses:
    WADSWORTH M. GEORGE,
    D. K. HONE.